United States Patent [19]

Cremer

[11] 4,439,142
[45] Mar. 27, 1984

[54] COOLING ZONE FOR A FIRING KILN WITH TRANSPORT ROLLERS

[76] Inventor: Gottfried Cremer, Steyrer Weg 6, D-5000 Koln 40/Junkersdorf, Fed. Rep. of Germany

[21] Appl. No.: 330,381

[22] Filed: Dec. 14, 1981

Related U.S. Application Data

[63] Continuation-in-part of Ser. No. 297,426, Aug. 28, 1981, abandoned.

[30] Foreign Application Priority Data

Aug. 28, 1980 [DE] Fed. Rep. of Germany ....... 3032450

[51] Int. Cl.³ .................. F26B 9/12; F27D 15/02; F27D 1/12
[52] U.S. Cl. ........................................ 432/18; 432/77; 432/83; 432/238
[58] Field of Search ............... 432/77, 83, 148, 238, 432/233, 235, 209, 18

[56] References Cited

U.S. PATENT DOCUMENTS

| | | | |
|---|---|---|---|
| 1,870,262 | 8/1932 | Morton | 432/83 |
| 2,949,869 | 8/1960 | Leeuwrik | 432/148 |
| 2,968,894 | 1/1961 | Hess | 432/83 |
| 3,453,708 | 7/1969 | Johnson | 432/83 |
| 3,801,265 | 4/1974 | Bricmont | 432/77 |
| 4,334,565 | 6/1982 | Jablin | 432/77 |

FOREIGN PATENT DOCUMENTS

| | | | |
|---|---|---|---|
| 1303169 | 5/1971 | Fed. Rep. of Germany | 432/77 |
| 1218982 | 1/1971 | United Kingdom | 432/18 |

*Primary Examiner*—John J. Camby
*Attorney, Agent, or Firm*—Price, Heneveld, Huizenga & Cooper

[57] ABSTRACT

A cooling zone for a kiln having a preheating and firing zone and with a train of rollers for moving tiles through the kiln in a single layer has an indirect cooling system using a fluid and more specially liquid cooling medium moving through coils over and/or under the tiles after burning. A system using louvers or two moving plates of slotted metal are used for screening off the coils to a greater or lesser degree for controlling the cooling effect.

4 Claims, 4 Drawing Figures

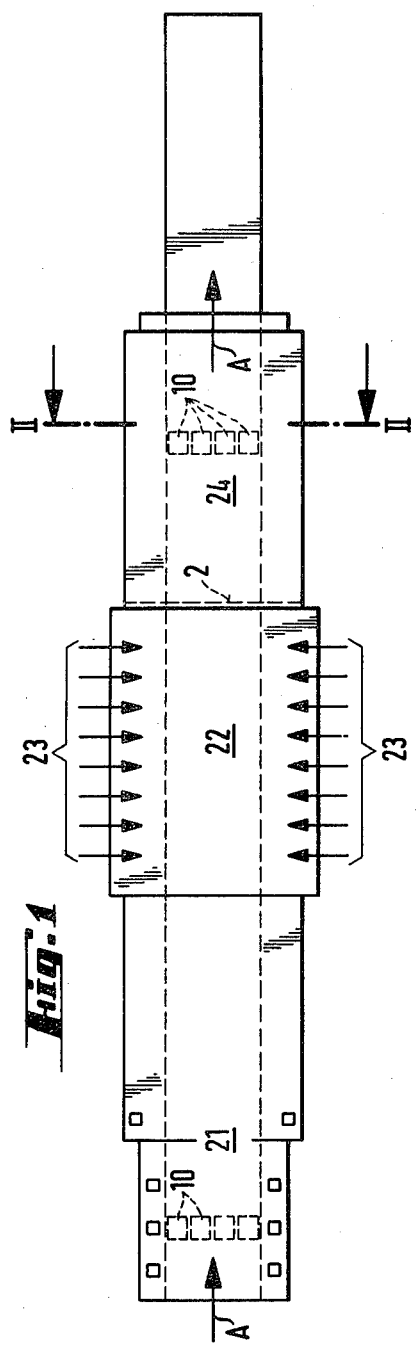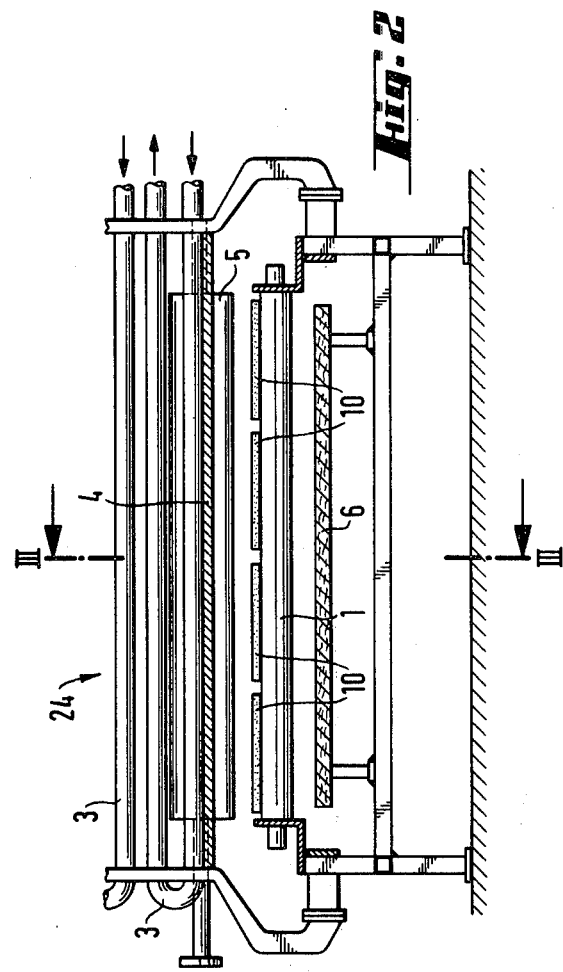

COOLING ZONE FOR A FIRING KILN WITH TRANSPORT ROLLERS

REFERENCE TO RELATED APPLICATION

The present application is a continuation-in-part application with respect to application Ser. No. 297,426 dated Aug. 28, 1981, now abandoned.

BACKGROUND OF THE INVENTION

The present invention is with respect to a kiln, more specially a roller kiln, made up of a preheating zone, a firing zone and a cooling zone, the structures to be fired, more specially ceramic tiles, being moved in a single layer through the kiln without using burning tools of refractory material.

In a roller conveyor kilns designed for firing ceramic material in a single layer and without any burning tools of refractory material, the ceramic material to be fired makes its way through the preheating, firing and cooling zones of the kiln on a train of rollers, made up of special-purpose steel or ceramic material and powered from a point outside the kiln. The useful effect of such kilns is that they may be run without the use of carriages and refractory burning tools, such transporting systems and burning tools for supporting the ceramic material having a great mass which has to be heated up by the kiln and then cooled down again in the cooling zone so that a large amount of the energy necessary for working the kiln is in fact wasted by such heating and not used by firing the ceramic structures.

In the case of such roller conveyor kilns firing the ceramic structures in a single layer and without the use of transporting systems and burning tools, not only is much less heat needed, but furthermore the firing operation itself takes place at a higher speed and more evenly and production cycles are very much shorter.

The cooling zone of such a kiln is normally designed for "quench" cooling, that is to say the necessary amounts of air are forced into the cooling zone to take effect on the ceramic structures after firing. However in such a kiln it is not possible to get round a shortcoming in this respect that—even if the firing zone is separated from the cooling zone by a curtain—the air from the cooling zone has an effect on the firing zone and, if the firing zone is run with a reducing atmosphere, this will be responsible for re-oxidation of the ceramic structures in the cooling zone and at least in the part of the firing zone which is next thereto. For stopping such re-oxidation of the ceramic structures in the cooling zone and a running back of such re-oxidation effects into the parts of the firing zone next to the cooling zone, it is possible (see German Offenlegungsschrift specification No. 2,824,367) for materials causing reduction in the cooling zone to be run into the kiln at a high pressure and at such a level and at such points in time, that, dependent on the excess still present in the kiln after part-reduction produced by putting in the amount of reducing agent, of the same is so small in amount that in the times between one input of reducing material and the next one, such excess may be burned, without any additional air being needed, by the neutral kiln atmosphere.

It will be clear to the reader that for running such a process a very complex control system is needed.

SHORT OVERVIEW OF THE INVENTION

One purpose of the invention is that of using a very simple design for nevertheless stopping effects on the fired ceramic material in the cooling zone and nearby parts of the kiln by the atmosphere of the cooling zone which otherwise would be the cause of re-oxidation of the ceramic material.

For effecting this and other purposes the cooling zone is cooled in the invention indirectly by a fluid (more specially liquid) heat transport medium.

On using a liquid heat transport medium, as for example water, which makes its way through coiled pipes or serpentines in the cooling zone over the fired ceramic structures, there is as well a quench-cooling of the fired structures causing a sharp drop in temperature in the cooling zone without, however, running the danger of having an effect on the atmosphere by forcing air into the cooling zone.

The further development of the invention is that in the cooling zone in addition to the pipe system for the heat transport medium and placed over the structures to be fired, or in place of such pipe system under the structures to be fired there are pipe systems for the heat transport medium, the radiant faces of such pipe system being adjustably shut off from the structures to be fired if necessary.

For stopping scale or the like falling from the coiled pipes for the heat transport medium onto the fired structures, these coiled pipes or serpentines are screened off if desired from the structures to be fired, and the heat exchange faces of the coiled pipe or serpentines with the heat transport liquid running through them are best designed for adjustment of their screening with respect to the structures to be fired so that not only are the structures to be fired safeguarded but furthermore the cooling operation may be controlled in any desired way so as to make certain of the best effect.

More specially, the cooling coils or serpentines are placed running across the direction of motion of the fired structures through the kiln, because in this case the inlet and outlet of the heat transport medium from the coil is specially simple. Furthermore the positioning and operation for the screening system is very much simpler in the case of such a positioning of the coiled pipes or serpentines.

The adjustable screening system is best made up of louver or venetian-blind-like paddle elements which are able to be turned, such elements completely covering over the coiled pipes or serpentines in the closed condition of the screening system, while on being twisted a bit they have the effect of uncovering narrow openings through which the heavily cooled atmosphere, present next to the coiled pipes or serpentines, may suddenly make its way downwards onto the fired structures for taking the desired effect.

In place of the venetian-blind-like curtains it is furthermore possible to have plates with slots which may be moved as desired in relation to each other so that slot openings for the cooled atmosphere are produced with a greater or lesser size, such cooled atmosphere then being able to make its way downwards onto the fired ceramic structures. Because of the chance of adjustment of the screening system which is furthermore possible for the cooling process in the cooling zone to be changed in any desired way.

An important useful effect of the invention is that the coiled pipes or serpentines for the heat transport medium may be joined up with a system for making use of waste heat, or with parts of the kiln.

DETAILED ACCOUNT OF WORKING EXAMPLES OF THE INVENTION

Further useful effects and details of the invention will be seen from the account now to be given of working examples.

In the figures:

FIG. 1 is a diagrammatic plan view of a kiln,

FIG. 2 is a section on the line II—II of FIGS. 1 and 3,

Figure 3:
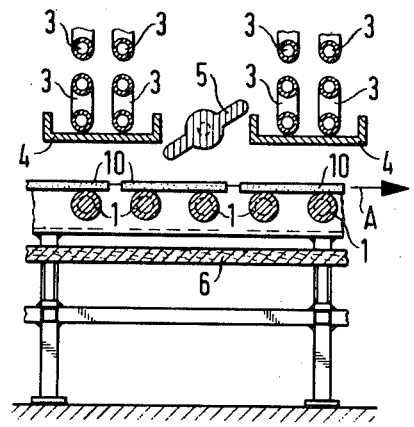
FIG. 3 is a part lengthways section through the cooling zone on the line III—III of FIG. 2.

A kiln is made up of preheating zone 21, a firing or burning zone 22, heated by burners pointing in the direction of the arrow 23, and a cooling zone 24. Ceramic structures, more specially ceramic tiles, are moved into the kiln in direction A and then after burning the fired tiles come out of it in a cooled condition at the other cooling zone end. The ceramic structures 10 (in the present example, the tiles) are transported through the kiln by rollers 1, forming a running length of conveyor running from the inlet to the outlet of the kiln. They are powered from a point outside the kiln for transporting the ceramic structures 10 through the kiln. In the cooling zone 24 of such a kiln cooling has so far, that is to say in the prior art, taken place by cooling air forced by blowers into the kiln over and under the runner conveyor. Even with a curtain 2 (see FIG. 1) between the firing zone 22 and the cooling zone it has so far not been possible to see that such cooling air does not have some effect on the firing zone and on the atmosphere therein. In the present invention the cooling of the ceramic structures in the cooling zone 24 does however not take place by blowing in cooling air but by indirect cooling using a current of heat transport medium, such medium being more specially in the form of a liquid such as water making its way through cooling coils or serpentines 3 in the top part of the cooling zone and best placed normal to the direction of motion through the kiln. With such a cooling system the air in the cooling zone is kept at rest and there is no chance of it having any undesired effect on the burning zone. For stopping any scale or the like which may be formed on the cooling coils or serpentines 3 from falling onto the ceramic structures to be fired, there is on the one hand a fixed cover marked at 4 and a further screen or cover in the form of a venetian-blind or louvers marked at 5 in FIG. 3. This venetian-blind 5 is made up of paddle-like parts stretching across and over the cooling zone and able to undergo adjustment so that they have the effect of generally completely covering over the openings between the fixed covers 4. In the case of designs with wide openings so many elements may be placed side by side that they together have the effect of covering over or shutting each of the openings. This design not only has the effect of additionally safeguarding the ceramic structures 10 on rollers 1 furthermore makes it possible for the cooling effect to be controlled and changed as desired. It is naturally possible to have, in place of the paddle-like elements or parts in FIG. 3, a system which is made up of slotted plates stretching across and over the cooling zone or in the length-direction thereof, the slots being able to be lined up in relation to each other to a greater or lesser degree so that openings of a greater or lesser size are produced for controlling and changing the cooling effect of the cooling coils or serpentines 3 on the ceramic structures 10 resting on rollers 1.

Under the conveyor of rollers 1 there is a refractory insulating structure 6.

The cooling coils 3 may be joined up with further plant or parts of the kiln (although this is not to be seen in the figures) as for example the preheating zone so that a part of the heat on the heat transport medium may be used for preheating the ceramic structures. The amounts of heat taken from the heat transport medium may furthermore be used in some other way, for example for drying.

Figure 4:
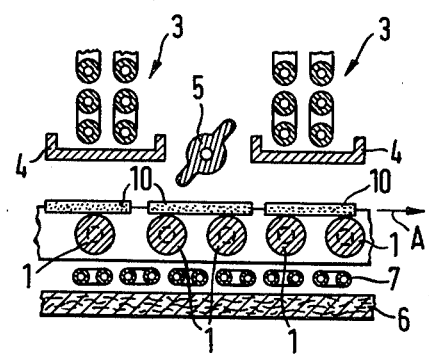
FIG. 4 is a part lengthways section on the same lines as FIG. 3 through a changed form of the cooling zone.

Between this refractory insulating structure 6 and the conveyor rollers 1 in FIG. 4 there are further cooling coils or serpentines 7, which, on the same lines as the cooling coils or serpentines 3 have parts like the louvers 5 for screening them off with the desired adjustment. This screening system is however not to be seen in the figure to make it more strightforward.

I claim:

1. A kiln for firing ceramic tiles 10, said kiln having a housing, said housing having preheating 21, firing 22 and cooling 24 zones arranged in tandem therein, a transport means consisting of a plurality of driven rollers 1 forming a transport surface extending through said zones for transporting the tiles therethrough in a single layer, said kiln characterized in that said cooling zone 24 forms a chamber having a non-oxidizing atmosphere which is substantially self-contained and static except for currents resulting from thermal convection, a plurality of conduits 3 containing a moving thermal energy absorbing liquid mounted in said cooling zone 24 of said kiln above said transport means 1, said conduits 3 extending normal to the direction A of movement of tiles 10 on said transport means 1, said conduits 3 being arranged in groups spaced apart lengthwise of the kiln, a stationary debris catching plate 4 beneath each group, said plates being spaced to provide a flow path therebetween for the upward passage of gases heated by the tiles, an adjustable damper element 5 mounted between adjacent plates 4 and in the flow path for controlling the flow rate of heated gas through said flow path for regulating the rate of cooling of the tiles, and further characterized in that a refractory panel 6 is provided in said cooling zone only beneath said transport means 1; between said refractory panel 6 and said transport means 1 a plurality of conduits 7 containing a moving thermal energy absorbing liquid being provided.

2. A kiln as described in claim 1 further characterized in that conduits 3 in each group above the transport means are arranged in both side-by-side and vertically stacked columnar patterns for rapid thermal energy absorption.

3. In a process for minimizing oxidation of ceramic tiles after firing and during cooling in a kiln having preheat, firing and cooling zones, the steps comprising: passing a single layer of ceramic tiles through the kiln on a transport surface of driven rollers, connecting the inlet end of the cooling zone of said kiln directly to the outlet end of the firing zone of said kiln, preventing any substantial flow of gases from the firing zone into the cooling zone, maintaining a basically oxygen free, substantially static, except for convection currents, atmosphere within the cooling zone, providing a heat exchange means above the tile in the cooling zone and removing thermal energy from the tile solely by heat exchange between the gases flowing by convection around the tile and a liquid thermal energy absorbent material flowing through a heat exchanger, controlling the rate of cooling by varying the flow of the gases between the tile and the heat exchanger, transporting any excess cooling chamber heat to the preheat zone of the kiln.

4. In a process for minimizing oxidation of ceramic tile after firing, providing a separate and defined cooling zone into which the tile are introduced from the firing chamber at a continuous, predetermined rate; maintaining a substantially static non-oxidizing atmosphere in the cooling zone substantially isolated from the exterior atmosphere and from atmosphere withdrawal into the firing chamber; cooling the tile solely by heat transfer from the tile to a liquid cooled heat absorption means both above and below the tile utilizing only convection currents in said atmosphere and controlling the rate of cooling solely by regulating the rate of flow of the atmosphere between the tile and heat absorption means.

* * * * *